(No Model.)  4 Sheets—Sheet 1.
G. M. GRAHAM.
APPARATUS FOR MOLDING CONCRETE CONDUITS.
No. 596,586.  Patented Jan. 4, 1898.
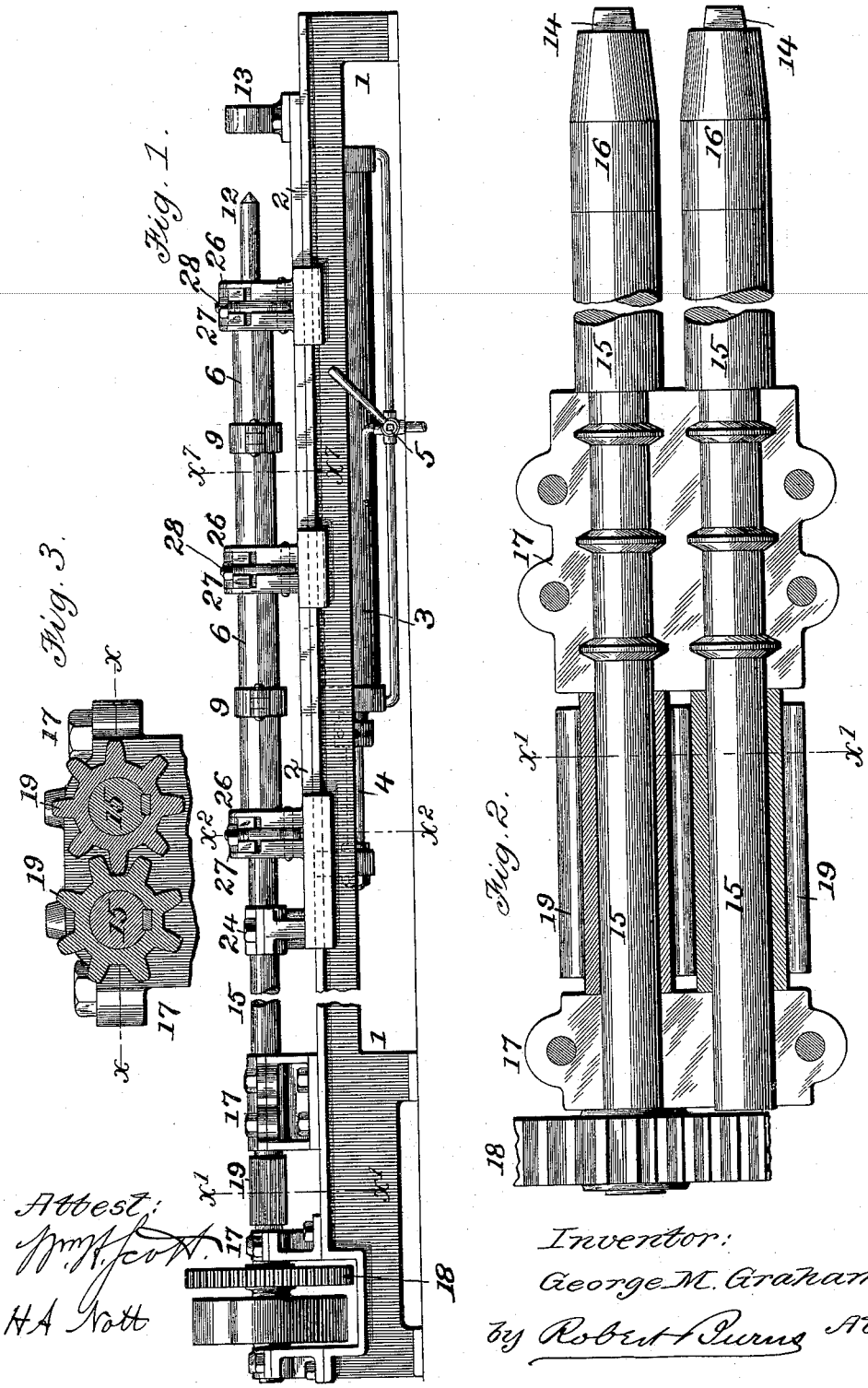
Attest:
Wm. H. Scott.
H. A. Nott
Inventor:
George M. Graham.
by Robert Burns Atty.

(No Model.) 4 Sheets—Sheet 2.
G. M. GRAHAM.
APPARATUS FOR MOLDING CONCRETE CONDUITS.
No. 596,586. Patented Jan. 4, 1898.
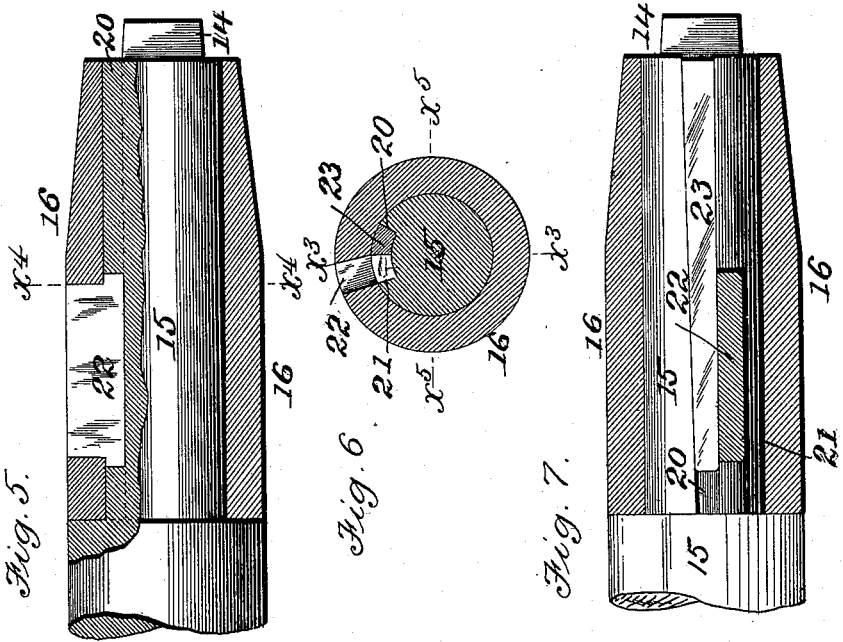
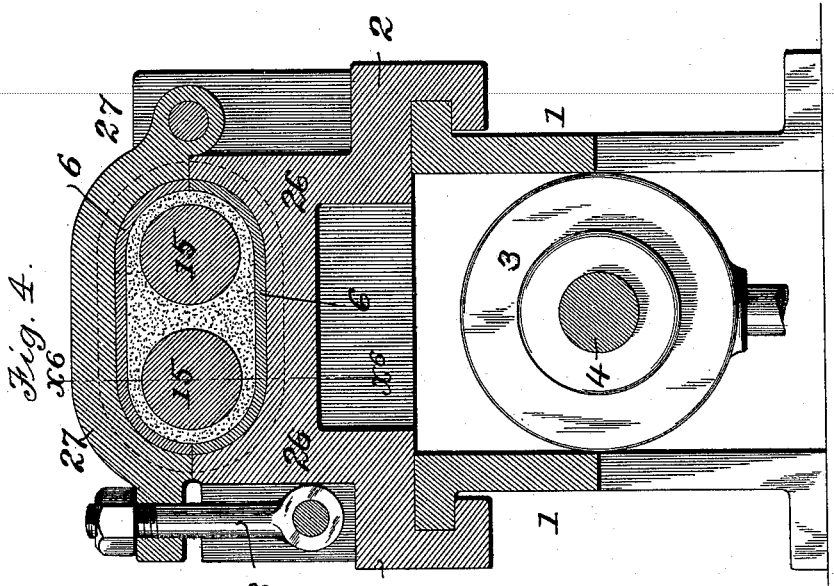
Attest:
Wm. A. Scott.
H. A. Nott.
Inventor:
George M. Graham.
by Robert Burns Atty.

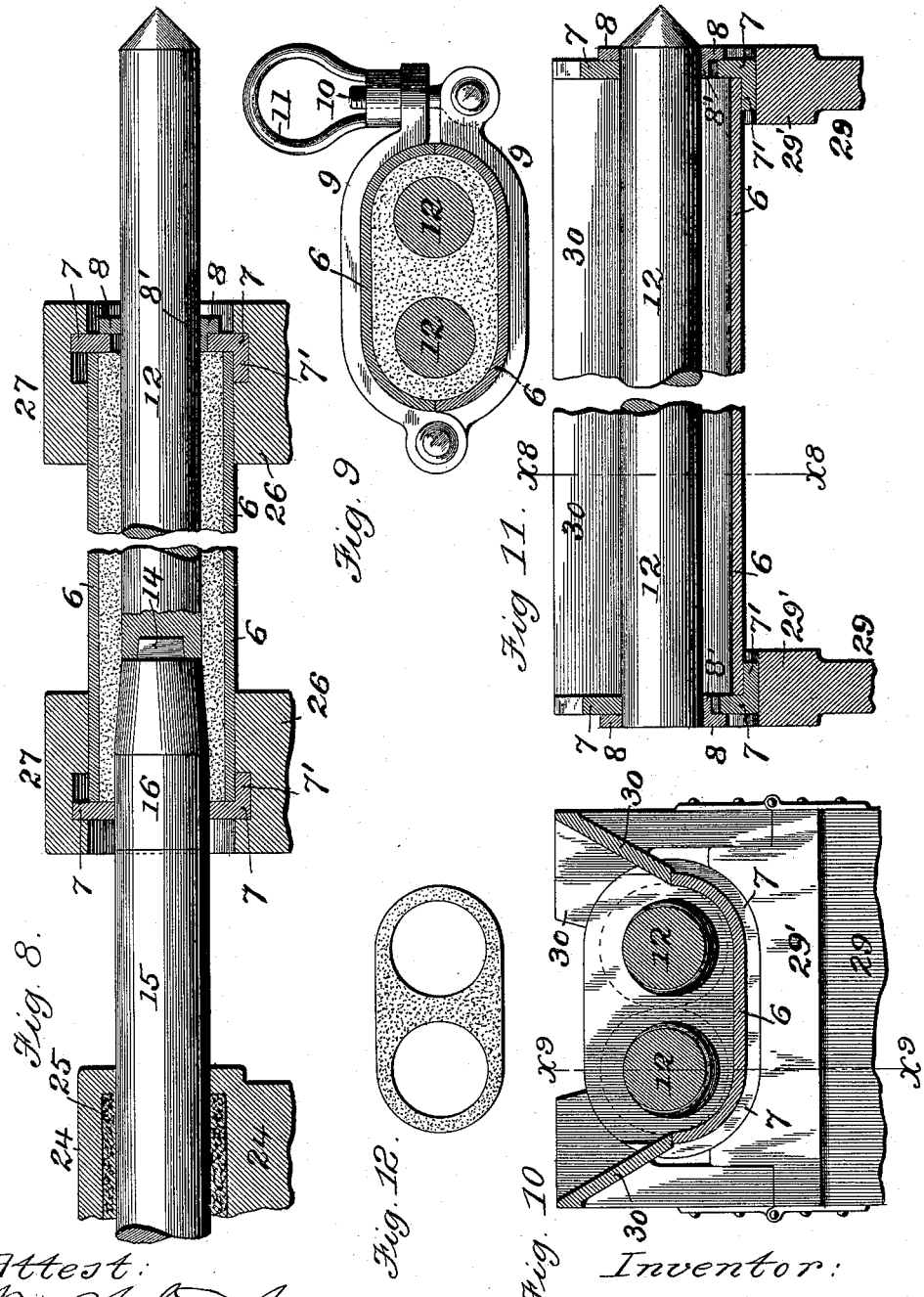

(No Model.)  4 Sheets—Sheet 4.
G. M. GRAHAM.
APPARATUS FOR MOLDING CONCRETE CONDUITS.
No. 596,586. Patented Jan. 4, 1898.
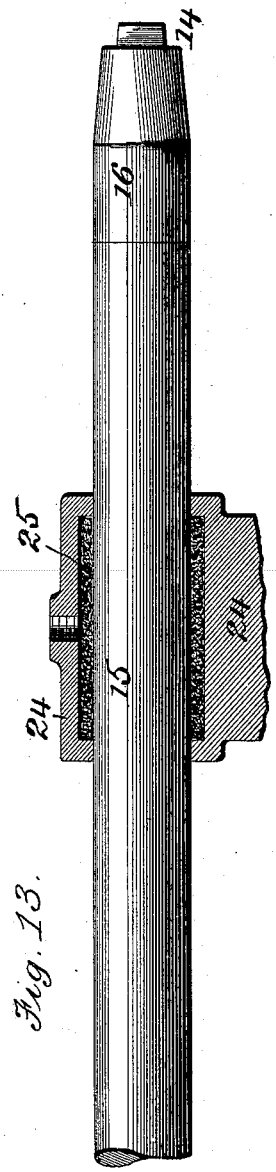
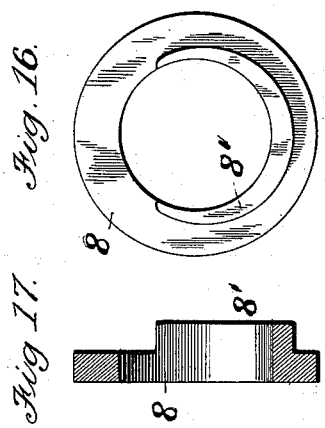
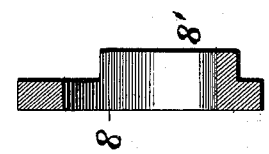
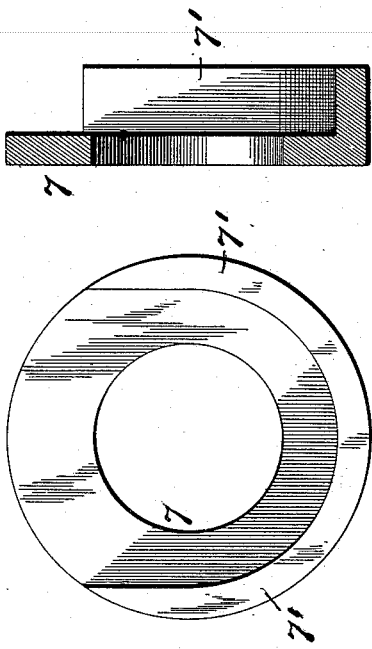
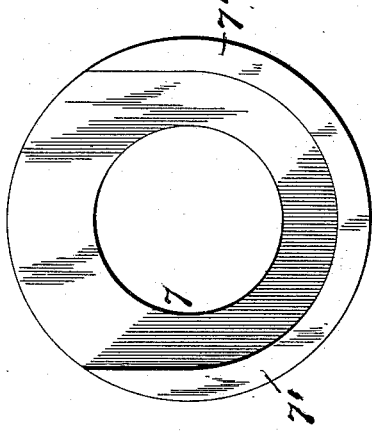
Attest:
Wm H Scott
H A Nott
Inventor.
George M. Graham,
by Robert Burns Att'y.

UNITED STATES PATENT OFFICE.

GEORGE M. GRAHAM, OF CHICAGO, ILLINOIS.

APPARATUS FOR MOLDING CONCRETE CONDUITS.

SPECIFICATION forming part of Letters Patent No. 596,586, dated January 4, 1898.

Application filed May 13, 1896. Renewed April 15, 1897. Serial No. 632,343. (No model.)

*To all whom it may concern:*

Be it known that I, GEORGE M. GRAHAM, a citizen of the United States, residing at Chicago, in the county of Cook and State of Illinois, have invented a certain new and useful Improvement in Apparatus for Molding Concrete Conduits; and I do hereby declare the following to be a full, clear, and exact description of the same, reference being had to the accompanying drawings, forming a part of this specification.

This invention relates to that class of molding apparatus in which a tapering core is forced through a mold filled with concrete to compact the same against the walls of the mold to form a section of pipe, the object of the present improvement being to provide a simple and efficient apparatus for molding or compressing concrete conduits, in which an even filling of the mold is primarily attained, a uniform distribution of the concrete around the walls of the mold effected, so that the conduit produced will be of uniform density throughout, and with which conduits of a small bore and great comparative length can be made in a certain quick and efficient manner, all as will hereinafter more fully appear, and be more particularly pointed out in the claims. I attain such objects by the construction and arrangement of parts illustrated in the accompanying drawings, in which—

Figure 1 is a general side elevation of a conduit-molding machine constructed in accordance with the present invention; Fig. 2, an enlarged detail horizontal section at line $x\ x$, Fig. 3, illustrating the dual arrangement of the conduit-forming mandrels, supporting-boxes, and gearing by which they are rotated in unison; Fig. 3, an enlarged detail transverse section at line $x'\ x'$, Figs. 1 and 2, illustrating the connecting gearing between the conduit-forming mandrels; Fig. 4, an enlarged transverse section of the machine at line $x^2\ x^2$, Fig. 1; Fig. 5, an enlarged detail longitudinal section of one of the conduit-forming mandrels, taken at line $x^3\ x^3$, Fig. 6, and illustrating the means for securing the tapering removable head of the mandrel in place; Fig. 6, an enlarged detail transverse section of the same at line $x^4\ x^4$, Fig. 5; Fig. 7, an enlarged detail longitudinal section of the same at line $x^5\ x^5$, Fig. 6, and at right angles to the plane on which Fig. 5 is taken; Fig. 8, an enlarged detail longitudinal sectional elevation taken on line $x^6\ x^6$, Fig. 4, and illustrating the relative arrangement of the mold, mold-arbor, conduit-forming mandrel, &c.; Fig. 9, an enlarged transverse section at line $x^7\ x^7$, Fig. 1, of the mold and illustrating the clamp for holding the mold sections or halves together; Fig. 10, a transverse sectional elevation at line $x^8\ x^8$, Fig. 11, of the mold-filling apparatus; Fig. 11, a detail longitudinal section of the same at line $x^9\ x^9$, Fig. 10; Fig. 12, an end elevation of the multiflue conduit formed by the present apparatus; Fig. 13, a detail longitudinal sectional elevation showing the conduit-forming mandrel and the means for applying the glaze-forming compound thereto; Fig. 14, an enlarged elevation of one of the mold-caps detached; Fig. 15, a longitudinal section of the same; Fig. 16, an enlarged elevation of one of the supplementary collars of the mold-caps; Fig. 17, a longitudinal section of the same.

Similar numerals of reference indicate like parts in the several views.

Referring to the drawings, 1 represents the stationary bed or frame of the apparatus on which a longitudinally-moving mold-carrying carriage or table 2 is arranged to slide in any usual and well-known manner and to which movement is communicated in a positive manner by any usual and suitable mechanism, preferably by means of a stationary hydraulic or other cylinder 3, the piston-rod 4 of which is connected to the mold-carrying table, as shown.

5 is a four-way cock having connection by suitable pipes with a source of pressure-supply, a waste-receptacle, and the respective ends of the cylinders 3, so as to afford a convenient means for reversing the action of the same in order that the same will act to impart positive motion to the mold-carrying table 2 in either direction.

The mold in the present improvement will consist of two counterpart halves 6 6, joined together longitudinally and provided at each end with caps 7 and collars 8, to be hereinafter described, and which confine the concrete material within the mold during the operations of filling the mold and the compression of such material within the mold into a finished concrete conduit.

9 are two or more clamps for holding the mold halves or sections together, each clamp consisting of two substantially counterpart halves hinged together at one side and at the opposite side provided with a clamping-bolt 10, that is preferably hinged to one of the sections, with its clamping-nut having a bearing against a flange on the other clamp-section. The clamps will usually be made as fixtures upon the mold by the riveting of one of the clamp-sections to one of the mold sections or halves, preferably the upper or cover section of the mold.

In the construction illustrated in Fig. 9 of the drawings the clamping-nuts of the bolts 10 of the mold-clamps will be formed with ring or loop extensions 11 for convenience in the clamping of the mold-sections together as well as to afford a ready means of attachment for an air-hoist or other usual means for handling or transporting the mold from the filling-table to the forming apparatus and from such forming apparatus back to the filling-table or to a separate mold-emptying table.

12 12 are a pair of cores or centers which are arranged within the mold before the same is filled with the loose concrete material and which are adapted to form the initial openings or bores in such filling that are afterward fully formed in the pressing apparatus as the same compresses the filling within the mold into a finished conduit. In the construction shown in the drawings as illustrative of my present invention two of such mold cores or centers are shown with a corresponding construction of the mold and other parts of the pressing apparatus, so that a two-flue conduit, such as shown in Fig. 12, will be produced. It is, however, within the province of the present invention to use but a single core or center 12 or a multiplicity of such mold-cores with a corresponding construction of the mold, &c., so as to form, as required, either a single-flue conduit or a multiflue conduit having any desired number of flues or bores.

The cores 12 will be of a much less diameter than that intended for the flues or bores of the finished conduit, the difference between the two constituting the amount of material that will be required to be displaced and compressed laterally within the mold during the operation of forming a finished conduit. At one end the cores or centers will be formed with a conical end, so as to be capable of ready entrance into the supporting-eyes of the standards or boxes 13 upon the traveling table 2 of the apparatus that are intended to support said cores in proper axial position, as they are gradually forced out of the mold in the operation of forming the conduit, while the other end of such cores or centers 12 will be formed with non-circular orifices for engagement with a non-circular projection 14 on the forward end of the conical pressing-mandrel 15, by which the material is pressed laterally within the mold to form the conduit.

In the present invention the conduit-forming mandrels 15 are mounted at one end in bearing-boxes 17 on the main frame and receive rotary motion from any suitable source of driving power, usually by a gear-wheel 18 on said shaft that has pinion connection with a counter-shaft carrying a drawing-pulley, as illustrated in Fig. 1. In the apparatus shown in the drawings, and in which a dual arrangement of the mandrels 15 are employed, the second mandrel will be geared by means of a small pinion 19 with a similar pinion on the other mandrel, so that both will have positive rotation.

The conical or tapering pressing portion of the mandrel 15 will be made in the form of a sleeve 16, separate and detachable from the cylindrical body portion 15 of the mandrel, so as to be capable of removal and replacement when worn, and to this end will be provided with a central bore fitting the reduced end of the mandrel 15, which is formed with a longitudinal keyway 20 and a lateral recess 21, while the sleeve 16 is provided with an inwardly-extending spline 22, that is adapted to slide endwise along the keyway 20 and be pushed laterally into the recess 21, into which it is adapted to fit snugly, 23 being a key that is subsequently driven into the keyway 20 to hold the parts in proper locked condition. (See Figs. 5, 6, and 7.)

24 is a steady box or standard secured to the forward end of the mold-carrying table 2, having a bore through which the forming-mandrel 15 passes and by which the forward end of such mandrel is supported.

25 is a chamber or receptacle formed in said box 24 and in communication with the bore thereof and which is adapted to contain a supply of oil or other like lubricating compound, the purpose being to coat the mandrel with such compound as it passes into the mold to form a conduit, and in turn forcibly apply such compound in the form of a thin glaze or coating upon the bore or flue of the conduit during the operation of forming the same, such coating on the mandrel also acting to prevent excessive wear and friction of the mandrel while in operation.

26 are mold-holding boxes or heads secured to mold-carrying table 2 and which are provided with hinged holding-caps 27, secured in place by clamping-bolts 28. These boxes are grooved out internally, so as to form recesses that receive the end caps 6 of the mold, so that by a tightening of the clamping-bolts 28 the same will be tightly held in place, the side of the boxes next adjacent to such recesses being also adapted to fit the outer periphery of the mold and have a clamping hold thereon.

The end caps 7 of the molds, heretofore referred to, will have a bore adapted to admit the passage of the conical-pointed mandrel 15, and this bore will be closed during the filling and initial handling of the mold by the annular collars 8, which are adapted to fit upon the cores or centers 12. The end caps 7 will have marginal flanges 7', that are adapted to fit the lower mold half or section, but are cut away, so as to permit the placing of the upper mold half or section in place upon the lower half or section and at the same time guide the upper half into proper position upon the lower one. (See Figs. 13 and 14.) The annular collars 8 will also have marginal flanges 8', that are of an eccentric formation, as shown in Figs. 16 and 17, so as to admit of the cores or centers 12 being placed above an axial position in the mold during the filling operation of the mold, so that a larger amount of material than ordinary can be placed in the lower portion of the mold, as I have found from practical experience that without some such provision the bore or flue in the conduit when formed will not be central in the conduit, but will be deflected toward the lower surface of the same, making an imperfect conduit, the variation in such displacement of the flues or bores varying with a variation of the material in the bottom of the mold and succeeding sections of conduits not having their flues or bores in proper alinement.

29 is the filling-table, having blocks 29' at each end, that are notched out to receive the respective end caps 7, which in turn support the lower mold half or section.

30 are hinged hopper-sections, the lower ends of which fit the lower mold section or half and are adapted to direct the loose concrete material into the same in a ready and convenient manner.

In the operation of the present apparatus the lower mold-section with its end caps 6, the cores or centers 12, and collars 7 will be supported upon the filling-table 29 and the hinged hopper-sections 30 turned up, so as to be in proper position to guide the material into the lower mold-section and around the cores or centers 12, such cores or centers having been previously raised to the eccentric position heretofore referred to, as illustrated in Figs. 10 and 11 of the drawings. After the lower mold-section is filled the material is heaped upon the same by hand, after which the hinged hopper-sections 30 are folded down and the upper mold half or section is placed in position and the holding-clamps 9 tightened thereon to securely clamp the mold-sections together. The filled mold is then transported by an air-hoist or other suitable means to the pressing apparatus and secured in place in the mold-supporting boxes 26 on the mold-carrying table 2. The sleeves 8 next to the pressing-heads 15 are then removed and the mold-carrying table moved forward to cause an engagement of the non-circular projections 14 on the pressing-heads 15 to engage in the non-circular orifices in the end of the cores or centers 12, after which the driving-gear of the pressing-heads is thrown into action, so as to cause a positive rotation of such pressing-heads. At the same time the mold-carrying table is caused to move toward the forming-mandrels in a gradual and positive manner by means of the hydraulic engine heretofore described, carrying the mold forward upon the forming-mandrels, so that the gradual entrance of the same into the mold, combined with the rotary movement of its tapering head, will force the concrete material laterally within the mold and compact the same into the form of a completed conduit. With a movement of the forming-mandrel into the mold the cores or centers 12 are pushed out of the mold in a corresponding manner, such cores maintaining the loose concrete material in proper position within the mold until the forming-mandrel advances to compress the same against the side of the mold. After the forming-mandrel has reached the rear end of the mold to complete the pressing of the material therein the hydraulic engine of the mold-carrying table is reversed to cause the mold to be drawn backward from off the mandrel, after which the mold is removed from the table 2 and opened for the removal of the finished section of conduit therefrom, after which the apparatus is ready for another operation.

Having thus fully described my said invention, what I claim as new, and desire to secure by Letters Patent, is—

1. In an apparatus for molding concrete conduits, the combination of a stationary frame, a forming-mandrel mounted to revolve thereon, and a longitudinally-moving carriage, a sectional mold mounted thereon, and a longitudinal core arranged within the mold, substantially as set forth.

2. In an apparatus for molding concrete conduits, the combination of a stationary frame, a forming-mandrel mounted to revolve thereon, a longitudinally-moving carriage, a sectional mold mounted thereon, and a longitudinal core arranged within the mold, in an eccentric position, substantially as set forth.

3. In an apparatus for molding concrete conduits, the combination of a stationary frame, a forming-mandrel mounted to revolve thereon, a longitudinally-moving carriage, a sectional mold mounted thereon, a longitudinal core arranged within the mold, and means for connecting the core and mandrel together, substantially as set forth.

4. In an apparatus for molding concrete conduits, the combination of a stationary frame, a forming-mandrel mounted to revolve thereon, a longitudinally-moving carriage, a sectional mold mounted thereon, a longitudinal core arranged within the mold, and means for connecting the core and mandrel together, the same comprising a non-circular recess in the end of the core, and a non-circular projection on the end of the mandrel, substantially as set forth.

5. In an apparatus for molding concrete conduits, the combination of a stationary frame, a forming-mandrel mounted to revolve thereon, a longitudinally-moving carriage, a sectional mold mounted thereon, clamps 9, for holding the mold-sections together, and a longitudinal core arranged within the mold, substantially as set forth.

6. In an apparatus for molding concrete conduits, the combination of a stationary frame, a forming-mandrel mounted to revolve thereon, a longitudinally-moving carriage, a sectional mold mounted thereon, end caps arranged on the mold and formed with orifices for the passage of the forming-mandrel and a longitudinal core arranged within the mold, substantially as set forth.

7. In an apparatus for molding concrete conduits, the combination of a stationary frame, a forming-mandrel, mounted to revolve thereon, a longitudinally-moving carriage, a sectional mold mounted thereon, end caps arranged on the mold and formed with orifices for the passage of the forming-mandrel, collars 8 fitting said orifices, and a longitudinal core arranged within the mold, substantially as set forth.

8. In an apparatus for molding concrete conduits, the combination of a stationary frame, a forming-mandrel mounted to revolve thereon, a longitudinally-moving carriage, a sectional mold mounted thereon, end caps arranged on the mold and formed with orifices for the passage of the forming-mandrel, collars 8 fitting said orifices, and a longitudinal core supported in the mold in an eccentric position, substantially as set forth.

9. In an apparatus for molding concrete conduits, the combination of a stationary frame, a forming-mandrel mounted to revolve thereon, a longitudinally-moving carriage provided with boxes 26 having hinged caps, a sectional mold held within such boxes, and a longitudinal core arranged within the mold, substantially as set forth.

10. In an apparatus for molding concrete conduits, the combination of a stationary frame, a forming-mandrel mounted to revolve thereon, a longitudinally-moving carriage provided with boxes 26, having hinged caps, and recessed out to receive the end caps of the mold, a sectional mold provided with end caps and arranged within said boxes, and a longitudinal core arranged within the mold, substantially as set forth.

11. In an apparatus for molding concrete conduits, the combination of a stationary frame, a forming-mandrel mounted to revolve thereon, a longitudinally-moving carriage provided with boxes 26 having hinged caps, and a box 24, that supports the forward end of the forming-mandrel, and a sectional mold held within the boxes 26, substantially as set forth.

12. In an apparatus for molding concrete conduits, the combination of a stationary frame, a forming-mandrel mounted to revolve thereon, a longitudinally-moving carriage provided with boxes 26, having hinged caps, and a box 24, that supports the forward end of the forming-mandrel and is provided with a chamber 25 for containing a supply of compound for coating the mandrel, and a sectional mold held within the boxes 26, substantially as set forth.

13. In an apparatus for molding concrete conduits, the combination of a stationary frame, a forming-mandrel mounted to revolve thereon, a longitudinally-moving carriage provided with boxes 26 having hinged caps, and a box 13, for supporting the mold-core 12, in axial position as it is forced out of the mold, a sectional mold held within the boxes 26, and a core arranged longitudinally in the mold, substantially as set forth.

14. In an apparatus for molding concrete conduits, the combination of a stationary frame, a forming-mandrel mounted to revolve thereon and having a removable tapering head of a diameter equal to that of the body of the mandrel, a longitudinally-moving carriage, a sectional mold mounted thereon, and a core arranged longitudinally within the mold, substantially as set forth.

15. In an apparatus for molding concrete conduits, the combination of a stationary frame, a forming-mandrel mounted to revolve thereon, and having a removable tapering head secured in place by means of the lateral recess 21, spline 22, key 23, and keyway 20, a longitudinally-moving carriage, a sectional mold mounted thereon, and a core arranged longitudinally within the mold, substantially as set forth.

16. In a mold for molding concrete conduits as herein described, the combination of the two longitudinal mold-sections 6, 6, end caps 7, having central openings for the passage of a forming-mandrel, collars 8, closing said openings, and a core arranged longitudinally within the mold, substantially as set forth.

17. In a mold for molding concrete conduits as herein described, the combination of the two longitudinal mold-sections 6, 6, end caps 7 having central openings, and marginal flanges around their lower portion, collars 8, having marginal flanges of an eccentric formation and a core arranged longitudinally within the mold, substantially as set forth.

18. In an apparatus for molding multitubular concrete conduits, the combination of a series of forming-mandrels geared together by pinions 19, to positively rotate in unison, a longitudinally-moving carriage, a sectional mold mounted thereon, and a series of cores arranged longitudinally within the mold, substantially as set forth.

19. In an apparatus for molding multitubular concrete conduits, the combination of a series of forming-mandrels geared together by pinions 19, to positively rotate in unison, a longitudinally-moving carriage, a sectional mold mounted thereon and a series of cores arranged longitudinally within the mold in an eccentric position, substantially as set forth.

20. In an apparatus for molding multitubular concrete conduits, the combination of a series of forming-mandrels geared together by pinions 19, to positively rotate in unison, a longitudinally-moving carriage, a sectional mold mounted thereon, a series of cores arranged longitudinally within the mold, and means for connecting the cores and mandrels together, substantially as set forth.

21. In an apparatus for molding multitubular concrete conduits, the combination of a series of forming-mandrels geared together by pinions 19, to positively rotate in unison, a longitudinally-moving carriage, a sectional mold mounted thereon, a series of cores arranged longitudinally within the mold, and means for connecting the cores and mandrels together, the same comprising non-circular recesses in the ends of the cores, and non-circular projections on the ends of the mandrels, substantially as set forth.

22. In an apparatus for molding multitubular concrete conduits, the combination of a series of forming-mandrels geared together by pinions 19, to positively rotate in unison, a longitudinally-moving carriage, a sectional mold mounted thereon, clamps 9, for holding the mold-sections together and a series of cores arranged longitudinally within the molds, substantially as set forth.

23. In an apparatus for molding multitubular concrete conduits, the combination of a series of forming-mandrels geared together by pinions 19, to positively rotate in unison, a longitudinally-moving carriage, a sectional mold mounted thereon, end caps arranged on the mold and formed with orifices for the passage of the forming-mandrels, and a series of cores arranged longitudinally within the mold, substantially as set forth.

24. In an apparatus for molding multitubular concrete conduits, the combination of a series of forming-mandrels geared together by pinions 19, to positively rotate in unison, a longitudinally-moving carriage, a sectional mold mounted thereon, end caps arranged on the mold and formed with orifices for the passage of the forming-mandrels, collars 8, fitting said orifices, and a series of cores arranged longitudinally in the mold, substantially as set forth.

25. In an apparatus for molding multitubular concrete conduits, the combination of a series of forming-mandrels geared together by pinions 19, to positively rotate in unison, a longitudinally-moving carriage, a sectional mold mounted thereon, end caps arranged on the mold and formed with orifices for the passage of the forming-mandrels, collars 8, fitting said orifices, and a series of cores supported longitudinally in the mold in an eccentric position, substantially as set forth.

26. In an apparatus for molding multitubular concrete conduits, the combination of a series of forming-mandrels geared together by pinions 19, to positively rotate in unison, a longitudinally-moving carriage, a sectional mold mounted thereon, a box 24 on the carriage adapted to support the forward ends of the forming-mandrels, and a series of cores arranged longitudinally within the mold, substantially as set forth.

27. In an apparatus for molding multitubular concrete conduits, the combination of a series of forming-mandrels geared together by pinions 19, to positively rotate in unison, a longitudinally-moving carriage, a sectional mold mounted thereon, a series of cores arranged longitudinally in the mold, a box or standard 13, on the carriage, adapted to support the series of cores in axial positions as they are forced out of the mold, substantially as set forth.

28. In an apparatus for molding concrete conduits, the combination with a mold formed in longitudinal sections, of a mold-filling table that is adapted to support the lower mold-section and the mold-core in a horizontal position, and hopper sides hinged to the table at opposite sides of the mold, and adapted to fold down out of the way when the mold is filled, substantially as set forth.

In testimony whereof witness my hand this 9th day of May, 1896.

GEORGE M. GRAHAM.

In presence of—
ROBERT BURNS,
H. A. NOTT.